(12) United States Patent
Ebert

(10) Patent No.: US 6,488,602 B1
(45) Date of Patent: Dec. 3, 2002

(54) TENSIONING AND ABSORBING ELEMENT

(75) Inventor: Siegried Ebert, Freiroda (DE)

(73) Assignee: Ebert Kettenspanntechnik GmbH, Freiroda (DE)

( * ) Notice: Subject to any disclaimer, the term of this patent is extended or adjusted under 35 U.S.C. 154(b) by 0 days.

(21) Appl. No.: 09/623,091

(22) PCT Filed: Feb. 25, 1999

(86) PCT No.: PCT/EP99/01213

§ 371 (c)(1),
(2), (4) Date: Jan. 16, 2001

(87) PCT Pub. No.: WO99/43969

PCT Pub. Date: Sep. 2, 1999

(30) Foreign Application Priority Data

Feb. 26, 1998 (DE) .......................... 198 08 129

(51) Int. Cl.⁷ .............................. F16H 7/08; F16H 7/22
(52) U.S. Cl. ........................................ 474/101; 474/109
(58) Field of Search ................ 474/101, 109, 474/111, 199, 133–136, 141

(56) References Cited

U.S. PATENT DOCUMENTS

| | | | | |
|---|---|---|---|---|
| 1,567,494 A | * | 12/1925 | Fahraney | 474/101 |
| 3,574,287 A | * | 4/1971 | Heidacker | 474/101 |
| 5,460,059 A | * | 10/1995 | Kato | 474/101 X |
| 5,551,926 A | * | 9/1996 | Ebert et al. | 474/101 |
| 6,126,562 A | * | 10/2000 | Brangenfeldt | 474/101 X |

FOREIGN PATENT DOCUMENTS

| | | | |
|---|---|---|---|
| DE | 275 166 A3 | | 1/1990 |
| DE | 4108485 | * | 9/1992 |
| DE | 43 17 033 C1 | | 11/1994 |

OTHER PUBLICATIONS

"Machine Design" p. 50, Jul. 24, 1997, (No Author).

* cited by examiner

Primary Examiner—Thomas R. Hannon
Assistant Examiner—Marcus Charles
(74) Attorney, Agent, or Firm—Muramatus & Associates

(57) ABSTRACT

A tensioning and damping element for chain drives, which comprises an elastically deformable ring part and a toothed rim arranged at the periphery thereof, the ring part being circular in the stress-free, uninstalled state and assuming, in the stressed, installed state, an ellipse-like shape between a non-loaded strand and a loaded strand of the chain drive, the toothed rim engaging with the non-loaded strand and the loaded strand and in so doing transmitting to the two strands a tensioning force which is caused by the ellipse-like deformation of the ring part. The ring part is constructed in such a manner that its cross-sectional profile steadily changes with increasing deformation of the ring part, in such a manner that the ratio of the height of the cross-sectional profile to the width of the cross-sectional profile in the maximally biased state of the ring part is at least 4% smaller than in the stress-free state of the ring part.

7 Claims, 6 Drawing Sheets

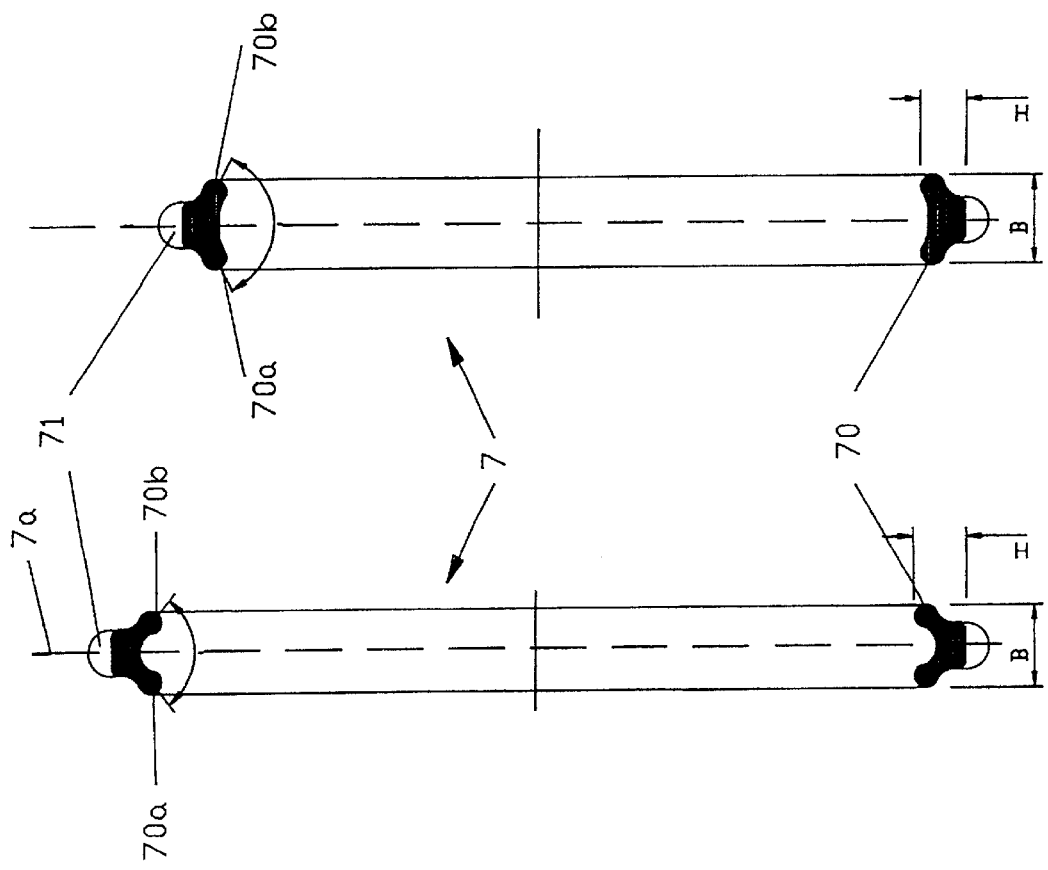

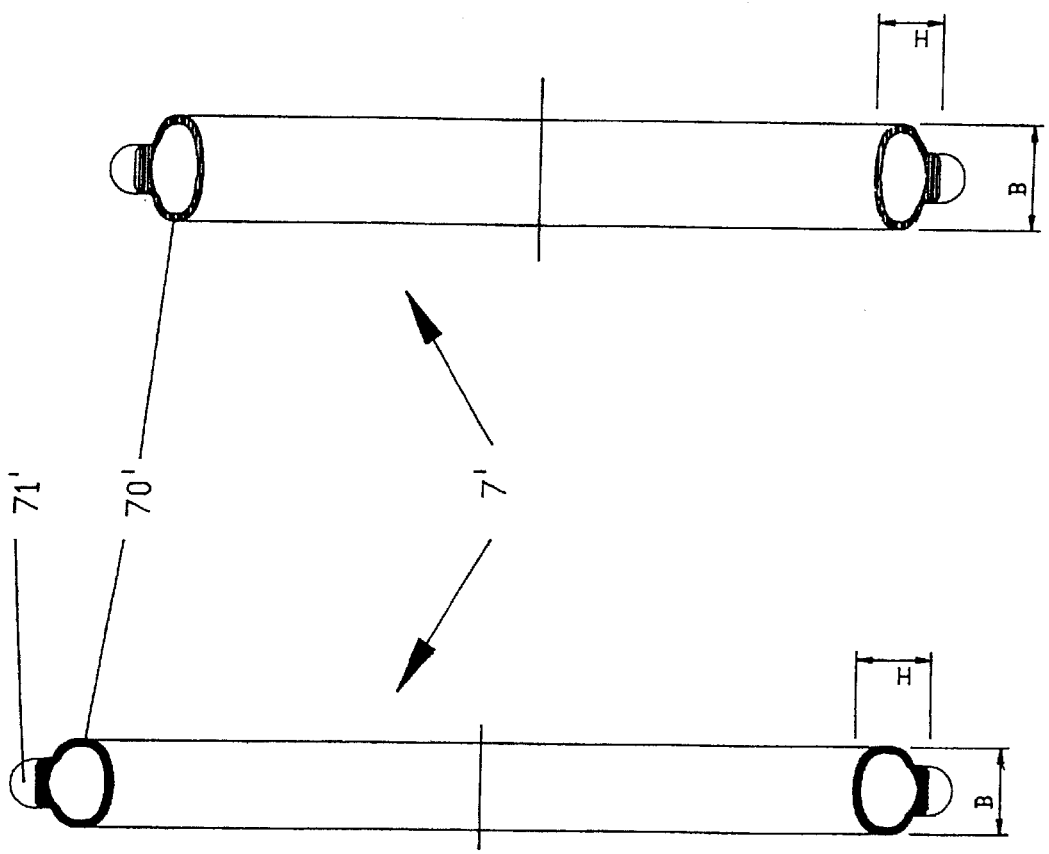

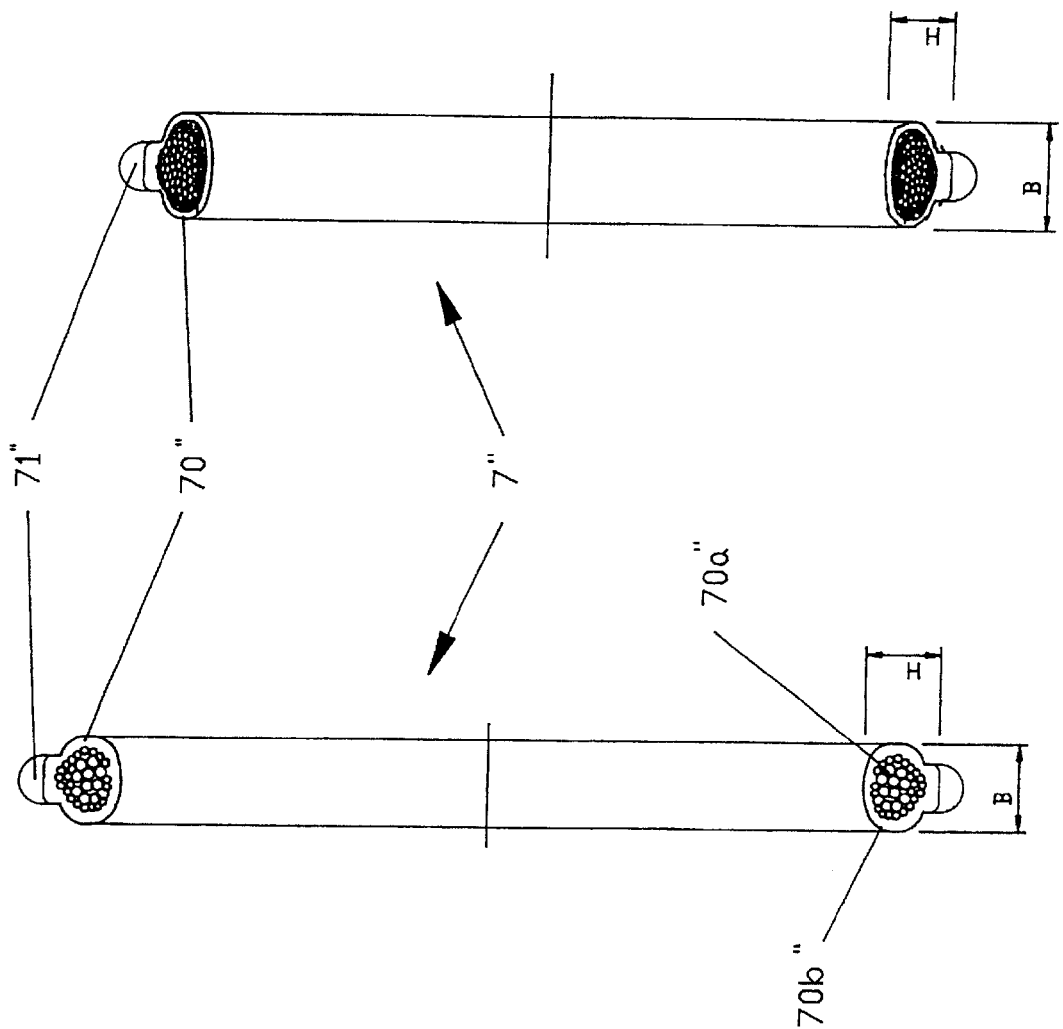

TENSIONING AND ABSORBING ELEMENT

FIELD OF THE INVENTION

The invention relates to a tensioning and damping element consisting of an elastomeric material for chain drives, especially a tensioning and damping element for the secondary chain drive of a motorcycle exhibiting temporary alteration of the distance between the centers of the sprocket wheels.

BACKGROUND OF THE INVENTION

In motorcycles having a secondary chain drive and a rear wheel swinging arm, there is the problem of the temporary alteration of the distance between the centers of the sprocket wheels during the swinging movement away from the middle position of the swinging arm, which is used as the position for adjusting the slack of the chain and the distance between the centers of the sprocket wheels, in the phases of the upper, deflected end position of the swinging arm and the lower, rebound end position of the swinging arm. Upon deflection and rebounding of the swinging arm, therefore, the distance between the centers of the sprocket wheels is also always reduced, with the effect that the chain slack in the non-loaded strand becomes greater. The cause of this is the position of the sprocket wheel at the gearbox output which is determined by the design and which does not coincide with the pivot of the rear wheel swinging arm but lies in front of the pivot in the direction of travel.

The temporary alteration of the distance between the centers is combined at the same time with an enforced rotation of the rear wheel, since the rear wheel is rolling along the roadway when the distance of the center point of the wheel from the sprocket wheel at the gearbox output changes. The same rotational movement as the rear wheel is performed, therefore, by the sprocket wheel on the rear wheel and, at a suitable gear ratio, also by the sprocket wheel at the gearbox output. The temporary alteration of the distance between the centers and the enforced rotation of the rear wheel by the rolling movement during deflection and rebounding exacerbate other and impair the driving stability of the motorcycle.

When there is a large amount of slack in the non-loaded strand, oscillations and shocks furthermore occur in the non-loaded strand, which have an adverse effect on the driving characteristics of the motorcycle. To avoid that disadvantage, therefore, a spring-loaded chain tensioning device directed towards the non-loaded strand is usually provided.

In the transition phases from acceleration to braking or during gear-changing, there will also be phases in which the loaded strand also is not loaded. One also speaks in this context of "double non-loaded strand phases" in which also the loaded strand briefly runs under no load. Those phases are especially dangerous, since they may cause the circulating, temporarily overlong, chain which is loaded only by centrifugal force to ride up on the sprocket wheel at the gearbox end, which may result in indifferent changing of the gear ratio of the secondary chain drive and/or in skipping of the chain.

The alteration of the distance between the centers, the enforced rotation of the rear wheel and the double non-loaded strand phases result in indifferent phases of the vertical dynamics of the vehicle which are affected by springing, damping and tire resilience and in indifferent phases of the longitudinal dynamics (shifting of the center of gravity and pitching motion) of the motorcycle. When cornering with changing load caused by braking or acceleration and when there is a large amount of slack in the non-loaded strand in the lower, rebound end position of the swinging arm, the contact surface of the tires may be so greatly reduced that it is no longer possible to control the motorcycle and a fall is inevitable.

A tensioning and damping element for chain drives is known from DD 275 166 A3. In that specification, the element is an axleless ring of elastic material which mates with the chain and which is elastically deformable between the shape of a concentric ring and the shape of a Cassini curve having an ellipse-like configuration. That tensioning and damping element is arranged between strands of the chain drive and engages therein by its toothed rim, automatically securing its position in the chain drive and tensioning diametrically.

A tensioning and damping element is also known from DE 43 17 033 C1, which will be described in more detail below with reference to FIGS. 2 and 3 using, as an example, a secondary chain drive of a motorcycle exhibiting temporary alteration of the distance between the centers of the sprocket wheels.

The chain drive shown in FIGS. 2 and 3 has a sprocket wheel 1 at the gearbox end, a rear wheel sprocket wheel 2 and a circulating chain consisting of a loaded strand 5 and a non-loaded strand 6. Arranged between the non-loaded strand and the loaded strand is a tensioning and damping element 7 which assumes an ellipse-like shape in this stressed, installed state. That tensioning and damping element comprises an elastically deformable ring part and a toothed rim arranged at the periphery thereof, the ring part being circular in the stress-free, uninstalled state. In the installed state, the toothed rim engages with the non-loaded strand and the loaded strand, whereby a tensioning force caused by the ellipse-like deformation of the ring part is transmitted to the two strands.

The rear wheel sprocket wheel 2 is fastened to one end of a rear wheel swinging arm 4 which, at the other end, can be pivoted about a swinging arm pivot 3 from the middle position shown in FIG. 2 into a deflected and a rebound end position of the swing. In FIG. 3, the deflected end position of the swinging arm is shown.

Owing to the fact that the swinging arm pivot 3 and the pivot of the sprocket wheel 1 at the gearbox end do not coincide, temporary alteration of the distance between the centers of the two sprocket wheels 1, 2 occurs upon movement of the rear wheel swinging arm 4. In the middle position shown in FIG. 2, a maximum distance between centers $a_{max}$ is produced and, in the two end positions, see FIG. 3, a minimum distance $a_{min}$. As a result of the distance between the centers being reduced, the chain slack in the non-loaded strand 6 increases.

The biased, installed tensioning and damping element always strives to attain its stress-free state in which it has a circular shape. The tensioning and damping element is so dimensioned that it never assumes its stress-free state in the installed state. That ensures that, even in the deflected end position shown in FIG. 3, in which greater chain slack occurs, a tensioning force will still be transmitted to the two strands by the tensioning and damping element. The tensioning and damping element therefore changes its shape in dependence upon the distance between the centers of the two sprocket wheels 1, 2, as can be seen especially from FIGS. 2 and 3. In the state shown in FIG. 2, the distance between the minor axis extremities N1, N2 of the tensioning and damping element deformed into an ellipse-like shape is smaller than in the state shown in FIG. 3. In addition to compensating for chain slack, the tensioning and damping element also damps deflections of the chain which may arise, for example, as a result of polygonal and over-running shocks and the effects of gravity and/or centrifugal force.

The tensioning force and the damping increase with increasing ellipse-like deformation of the tensioning and damping element as a result of dynamically elastic and plastic deformation parameters. In addition, the tensioning force is at the same time increased by static deformation parameters.

That means, however, that during driving operation, the tensioning and damping element 7 is dynamically loaded to a greater extent in the phases in which the rear wheel swinging arm 4 is in the middle position shown in FIG. 2, and in which the amount of chain slack is consequently smaller, than it is in the deflected end position of the rear wheel swinging arm shown in FIG. 3.

During operation of the chain drive, the tensioning and damping element rotates therewith owing to its engagement with the loaded and the non-loaded strand. In the process, elastic and plastic deformation occurs continuously in the ring part, the radially outside and inside regions of the ring part, in particular, being especially loaded. The deformation and recovery from deformation ultimately manifests itself in heat loss of the tensioning and damping element. Since, by reason of the material, the heat loss must not exceed a certain value in order to obtain sufficient tensioning force and damping, the maximum permissible rotation speed of the tensioning and damping element is predetermined.

Furthermore, large recovery distances and high recovery speeds of the elastic and plastic deformation components lead to more rapid fatigue of the material.

The disadvantage of the known tensioning and damping element for use in secondary chain drives on motorcycles having a rear wheel swinging arm is accordingly the fact that it is operated in the most frequently occurring middle position phase of the swinging arm, having the then correspondingly smaller amount of chain slack, in the range of its greatest ellipse-like deformation, and that, consequently, greater heat loss and material fatigue occurs as a result of the rotation.

As a result, in addition, the maximum permissible chain speed of the secondary chain drive and the maximum permissible speed of travel of the motorcycle are limited.

SUMMARY OF THE INVENTION

The problem underlying the invention is therefore to develop the tensioning and damping element in such a manner that it produces less lost heat in operation and is subject to slower material fatigue.

According to the invention, the ring part has a cross-section that, with increasing flection, exhibits a decreasing flexural resistance owing to its deformation, and, in the maximally deformed state caused by operation, the height to width ratio of the cross-section is at least 4% smaller than in the stress-free state.

The height to width ratio has a direct effect on the flexural resistance which opposes increasing deformation of the ring part. Thus, at a smaller height to width ratio, the flexural resistance also decreases.

That effect is especially advantageous in the case of a tensioning and damping element for a secondary chain drive of a motorcycle exhibiting temporary alteration of the distance between the centers of the sprocket wheels, since it is precisely in the middle position phase of the rear wheel swinging arm, in which the non-loaded strand has its smallest amount of slack in any case, that is to say when deflections and shocks are minimal, and in which the tensioning and damping element exhibits its greatest elliptical deformation, that the alteration of the cross-sectional profile results in a less flexurally resistant cross-section, so that ultimately less heat loss is produced and material fatigue is minimized.

In the case of the known ring part, in which the cross-section essentially does not change upon deformation, during rotation of the ring part, alternating uniaxial bending strains occur with stress concentrations in the peripheral fibers at the inside and the outside of the ring during passage through the regions of the major and minor axis extremities of the ring part deformed into an ellipse-like shape.

In the case of the ring part according to the invention, on the other hand, under the bending strain, a multi-axial stress distribution occurs with automatic deformation of the cross-sectional profile subjected to the bending strain to a less flexurally resistant cross-sectional profile. The special feature existing here is that the cross-sectional profile subjected to bending load yields by changing shape in several axial directions, specifically, however, into a shape having a lower flexural resistance, by virtue of the fact that the peripheral fibers, which are subject to greater load, orient themselves closer to the neutral bending axis as a result of the height reduction. The stresses caused by the rolling of the tensioning and damping element, which occur in the cross-sectional plane of the ring profile upon passage through the regions of the major and minor axis extremities (H1, H2, N1, N2) of the tensioning and damping element, are coupled with transverse expansion of the cross-section subjected to bending strain. That causes a kind of opening movement or a widening in the x axis and a constriction in the y axis of the cross-sectional profile. The cross-sectional profile existing after that spreading movement or widening and constriction has a lower flexural resistance than before. The deformation of the cross-sectional profile increases steadily with the deformation of the tensioning and damping element from its annular shape to the ellipse-like shape. With increasing deformation, therefore, the tensioning and damping element changes in a self-regulating manner to a state in which the flexural resistance or the tensioning force is reduced.

The tensioning and damping element accordingly has the advantage that, despite relatively great deformation in certain phases of the chain drive, especially during acceleration, braking and driving phases of a motorcycle in a relatively high speed range, associated with the middle position phase of the rear wheel swinging arm which then exists, it is subject to lower static, dynamic and thermal load, with the result that the maximum permissible chain speed can be increased.

Conversely, the tensioning and damping element has the advantage that, in the case of relatively slight deformation and a large amount of chain slack, it still tensions the chain sufficiently tightly. Such a situation arises in the case of motorcycles having a rear wheel swinging arm especially in the double non-loaded strand phase of the chain drive which can occur, for example, when shifting to a lower gear while simultaneously braking, double-declutching or engaging the clutch after changing gear combined with deflection and rebounding of the rear wheel swinging arm. Further embodiments of the tensioning and damping element will be explained in more detail using the following description of a number of illustrative embodiments and the drawings.

BRIEF DESCRIPTION OF THE DRAWINGS

FIG. 4a is a sectional view of the tensioning and damping element in accordance with a first illustrative embodiment in the stress-free state, FIG. 4b is a sectional view of the tensioning and damping element in accordance with the first illustrative embodiment in the stressed state, FIG. 5a is a sectional view of the tensioning and damping element in accordance with a second illustrative embodiment in the stress-free state, FIG. 5b is a sectional view of the tensioning and damping element in accordance with the second illustrative embodiment in the stressed state, FIG. 6a is a sectional view of the tensioning and damping element in accordance with a third illustrative embodiment in the stress-free state, and FIG. 6b is a sectional view of the tensioning and damping element in accordance with the third illustrative embodiment in the stressed state.

DETAILED DESCRIPTION OF THE INVENTION

Figure 1:
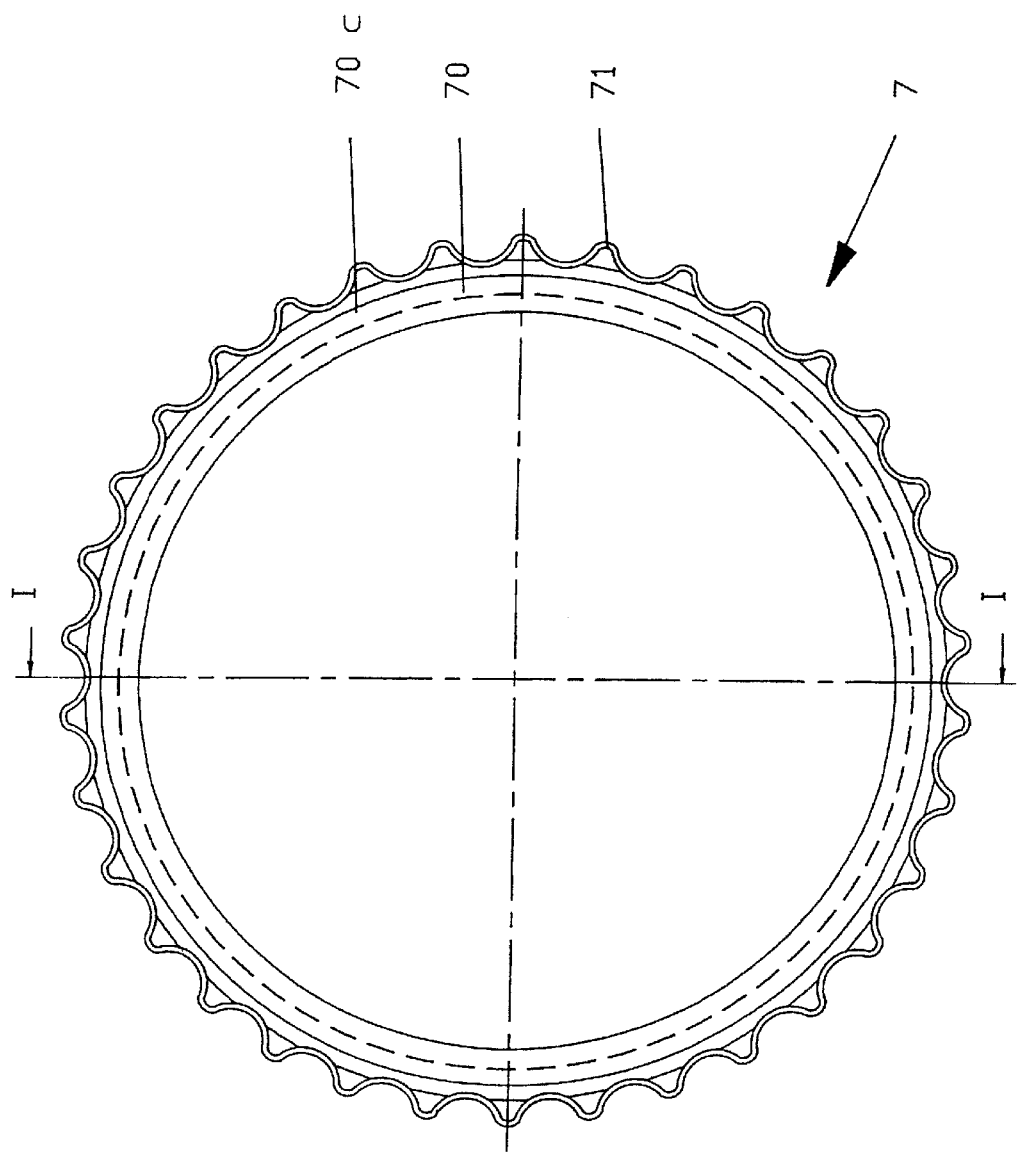
FIG. 1 is a side view of the tensioning and damping element.

FIG. 1 shows a tensioning and damping element 7 in the stress-free, uninstalled state. It is circular in shape and has an elastically deformable ring part 70 and a toothed rim 71 arranged at its periphery, the ring part 70 and the toothed rim 71 preferably being manufactured in one piece.

Figure 2:
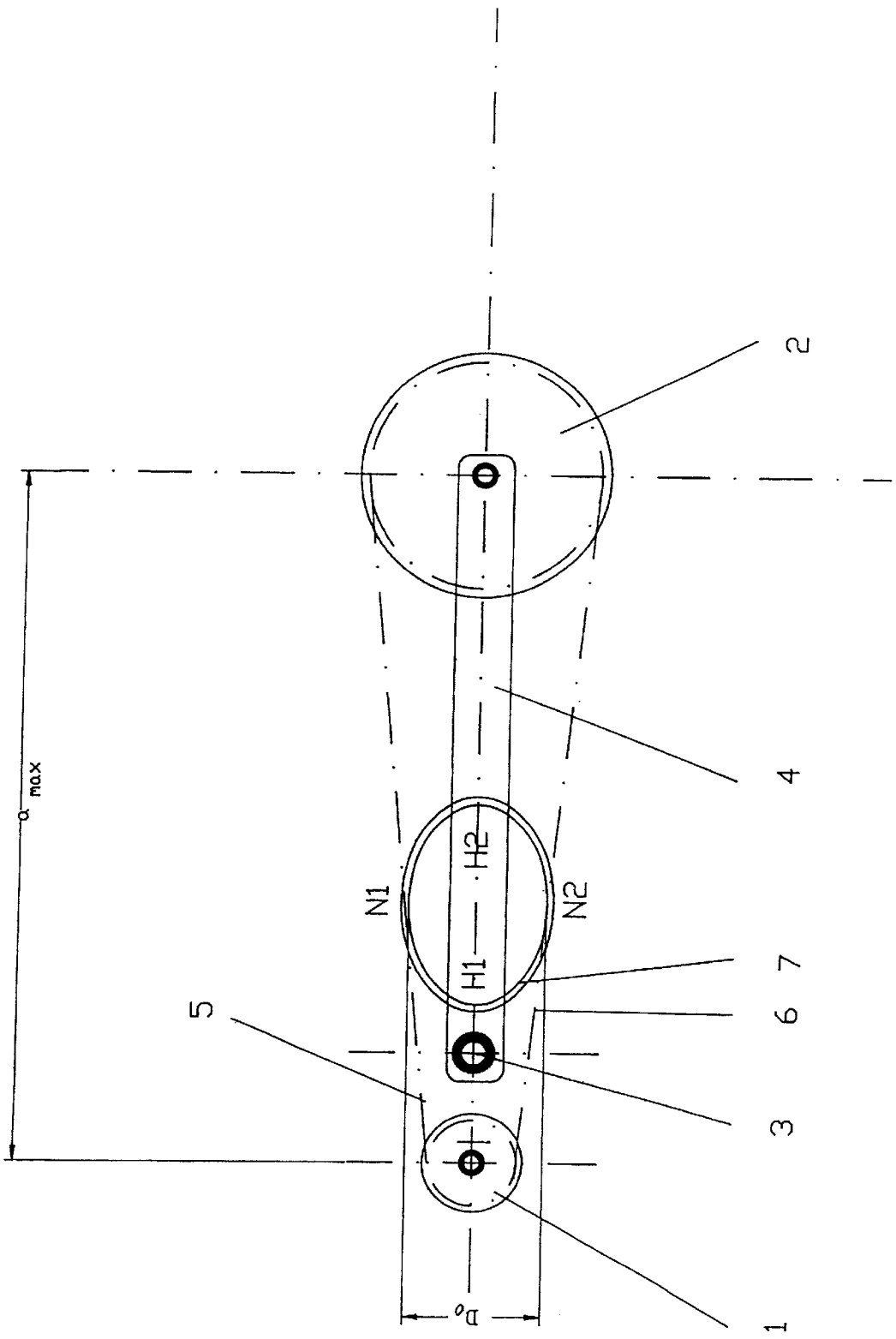
FIG. 2 is a schematic side view of the chain drive with tensioning and damping element in the middle position phase.
Figure 3:
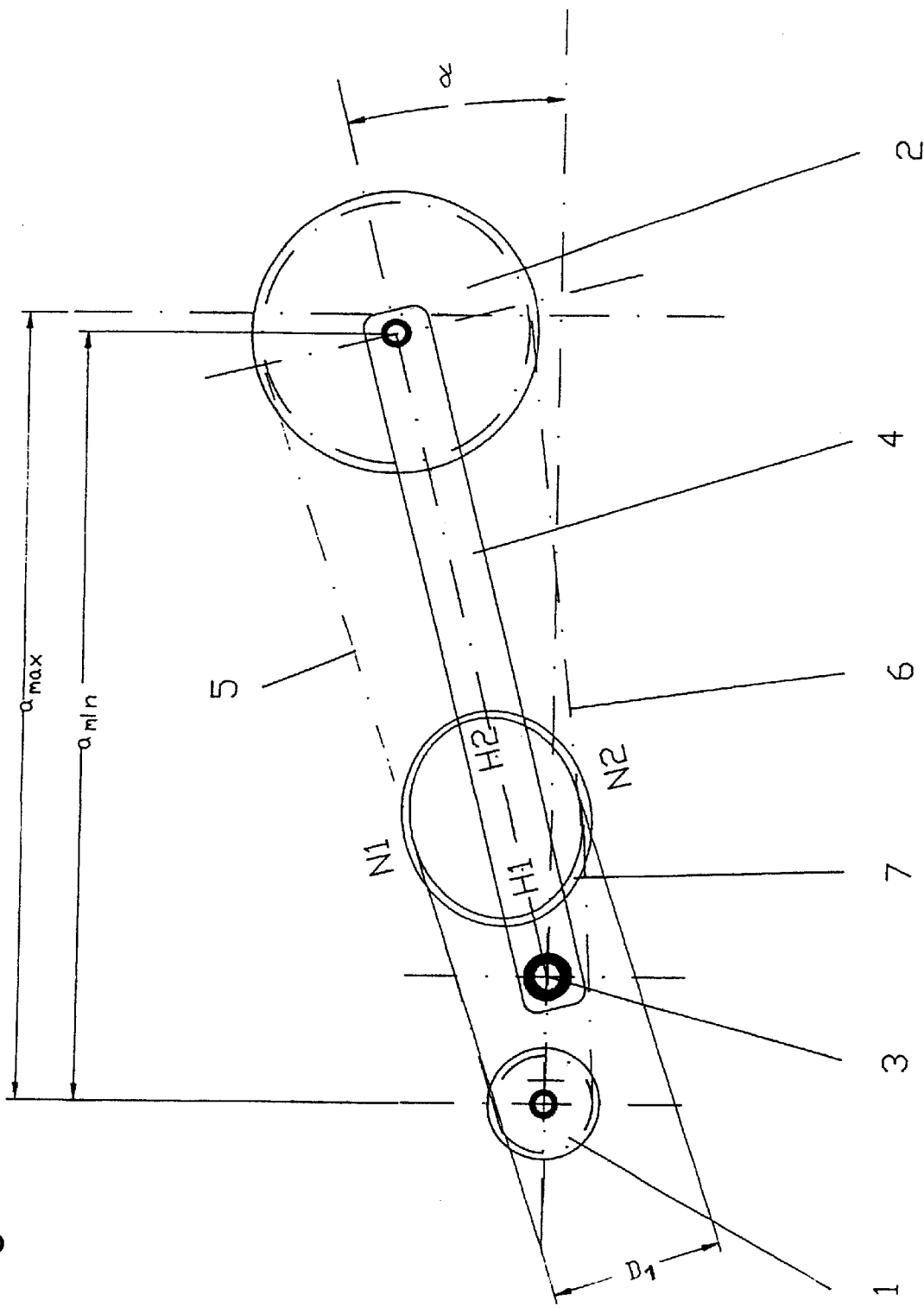
FIG. 3 is a schematic side view of the chain drive with tensioning and damping element in the deflected end position phase.

FIGS. 2 and 3 show the tensioning and damping element 7 in two different phases of the chain drive which have already been described in detail above. The tensioning and damping element 7 has in this case the shape of a Cassini curve with an ellipse-like shape in the axial ratio H1, H2:N1, N2 (distances between the major axis extremities and the minor axis extremities, respectively). In the illustrative embodiment shown, the ratio is, for example, 1.0:0.7.

The tensioning and damping element 7 tensions the loaded strand 5 and the non-loaded strand 6 diametrically. It will be apparent that, compared with the originally circular shape, the tensioning and damping element is curved to a lesser extent in the two chain engagement regions close to the minor axis extremities N1 and N2 and to a greater extent in the regions of the major axis extremities, in the vicinity of the points H1 and H2.

In FIG. 3, the rear wheel swinging arm 4 has been deflected from the middle position by an angle α of, for example, 14°. That deflection causes a reduction in the distance between the central axes of the sprocket wheel at the gearbox end and the rear wheel sprocket wheel 2 to the length $a_{min}$. The difference between $a_{max}$ and $a_{min}$ gives the temporary alteration of the distance between the centers of the sprocket wheels. Without the tensioning and damping element 7, there would be a large amount of chain slack in that state, which would result in the disadvantages described above.

Owing to the tensioning and damping element 7 arranged between the non-loaded strand 6 and the loaded strand 5, the chain is deflected in that region to the diametrical length $D_1$, which corresponds to the chain slack. The diametrical length $D_1$, is greater than the diametrical length $D_0$ in the position shown in FIG. 2. The tensioning force of the tensioning and damping element 7 tensions the loaded and non-loaded strands diametrically. The axial ratio H1, H2 N1, N2 has changed in FIG. 3 to 1.00:0.85.

It will be apparent that, compared with the originally circular shape, the tensioning and damping element 7 is curved to a lesser extent in the two chain engagement regions near the axis extremities N1 and N2 and to a greater extent in the regions of the major axis extremities near the points H1 and H2.

FIG. 4a shows a cross-section of the tensioning and damping element 7 along the line I—I in FIG. 1.

The tensioning and damping element 7 has a Y-shaped cross-sectional profile, the ring part 70 having on its radially inward side two arms 70a, 70b which are oriented symmetrically with respect to a longitudinal middle plane 7a and which together include an angle $β_1$ which, in the stress-free state of the tensioning and damping element 7, is from 90° to 180°. In the illustrative embodiment shown, an angle of 103° has been provided.

The tensioning and damping element 7 is manufactured from a homogeneous or almost homogeneous elastomeric material.

In the installed state of the tensioning and damping element 7, it has an ellipse-like shape, shown in FIGS. 2 and 3, its cross-sectional profile steadily changing with increasing deformation of the ring part 70. In FIG. 4b, the tensioning and damping element 7 is shown by way of example in the maximally stressed state shown in FIG. 2.

The cross-sectional profile of the ring part 70 shown in FIG. 4a has a height $H_0$ and a width $B_0$. By comparison, the cross-sectional profile shown in FIG. 4b has changed, owing to the deformation of the tensioning and damping element 7, in such a manner that the ratio of the new height $H_1$ to the new width $B_1$ is at least 4% smaller than the ratio of $H_0$ to $B_0$ in the stress-free state shown in FIG. 4a. Advantageously, the reduction in the height to width ratio is more than 10%.

The angle $β_2$ between the two arms 70a, 70b has become larger in the biased state shown in FIG. 4b and is 128° in the illustrative embodiment shown.

Between its radially outward and radially inward peripheral fibers, the ring part 70 has a neutral axis 70c which is neither stretched nor compressed during the flexion process. The compression and stretching of the outside and inside peripheral fibers is the greater the further away are those fibers from the neutral axis 70c. By reducing the height of the cross-sectional profile, therefore, the outside and inside peripheral fibers are also brought closer to the neutral axis 70c.

That is exactly what is achieved in the case of the first illustrative embodiment shown in FIGS. 4a and 4b as a result of the two arms 70a, 70b of the ring part 70 opening outward, thereby reducing the height of the cross-sectional profile, with increasing deformation of the tensioning and damping element 7. With increasing deformation, therefore, the tensioning and damping element 7 assumes a cross-sectional profile that has a reduced flexural resistance.

The material of the ring part 70 is alternately stretched and compressed by the rotation of the tensioning and damping element, that alternation taking place in each case after an angle of rotation of 90°.

The lower flexural resistance resulting from the alteration of the cross-sectional profile reduces, however, the heat loss caused by stretching and compression of the material and thereby minimizes the material fatigue.

In FIGS. 5a and 5b, a tensioning and damping element 7' in accordance with a second illustrative embodiment is shown. The side view of the damping element 7' is substantially comparable to the view shown in FIG. 1. The difference, however, lies in the construction of the ring part 70' which, in this illustrative embodiment, is in the form of a hollow body. In the stress-free state shown in FIG. 5a, that hollow body 70' is round and flattened in the region of the toothed rim 71'. The height to width ratio in the stress-free state is again $H_0/B_0$.

Upon deformation of the tensioning and damping element 7' the cross-sectional profile of the hollow body 70' changes in the manner shown in FIG. 5b. The cross-sectional profile of the ring part 70' which is still round in FIG. 5a takes on an elliptical shape in FIG. 5b, so that, in the installed state, both in the side view shown in FIGS. 2 and 3 and in its cross-sectional profile, the tensioning and damping element 7' has an elliptical shape. As a result of that alteration of the cross-sectional profile, there is again a ratio of height $H_1$ to width $B_1$ in the maximally biased state that is at least 4%, and preferably 10%, smaller than the ratio of height $H_0$ to width $B_0$ in the stress-free state.

In FIGS. 6a and 6b, a tensioning and damping element 7" in accordance with a third illustrative embodiment is shown, which has, in the ring part 70", a core region 70"a and an edge region 70"b consisting of materials having differing elasticity, the material used in the edge region 70"b having a greater modulus of elasticity than that of the material used in the core region 70"a.

As a result of that construction, upon deformation of the tensioning and damping element 7" in the stressed state, alteration of the cross-sectional profile likewise occurs, so that the ratio of the height of the cross-sectional profile to the width of the cross-sectional profile in the maximally biased state of the ring part is at least 4%, and preferably 10%, smaller than in the stress-free state of the ring part.

In order to obtain the desired effect of the reduction in the height to width ratio, the ring part 70" in accordance with the third illustrative embodiment has to be constructed as an inhomogeneous body in which materials having a differing modulus of elasticity are used at least for the core region and the edge regions.

In contrast to the tensioning and damping element known from DE 43 17 033 C1, tensioning and damping elements in accordance with the illustrative embodiments shown always have a lower flexural resistance in the stressed state than in the stress-free state. Since the flexural resistance determines the tensioning force with which the tensioning and damping element tensions diametrically, in contrast to the prior art, the tensioning force of the tensioning and damping element according to the invention is the smaller the greater is the deformation and the greater the smaller is the deformation.

In the middle position of the rear wheel swinging arm with the maximum distance between the central axes of the sprocket wheels, the tensioning and damping element is accordingly deformed to a high degree and produces a predetermined tensioning force and damping that are adequate for the design.

In the end position of the rear wheel swinging arm with the minimum distance between the central axes of the sprocket wheels and the greatest potential chain slack, on the other hand, the tensioning and damping element is deformed to a lesser degree. Owing to the greater flexural resistance of the cross-sectional shape, however, it exhibits the same or a greater tensioning force and damping. Related to the deflected tensioning distance, the tensioning and damping element therefore has a linear or decreasing tensioning force-damping characteristic.

When the tensioning and damping element is used in the secondary chain drive of a motorcycle it compensates for the chain slack resulting from the temporary alteration of the distance between the centers of the sprocket wheels and from the enforced rotation of the rear wheel during deflection and rebounding, and also double non-loaded strand phases, and damps the chain drive against indifferent gear changes and against oscillations and shocks.

What is claimed is:

1. A tensioning and damping element for chain drives, comprising:

an elastically deformable ring part; and a toothed rim arranged at the periphery of the elastically deformable ring part;

wherein the ring part has a cross-sectional profile that is circular in a stress-free state and has an elliptical shape in a stressed state and is provided between a non-loaded strand and a loaded strand of the chain drive; and wherein the toothed rim engages with the non-loaded strand and the loaded strand and in so doing transmits to the two strands a tensioning force which is caused by the ellipse-like deformation of the ring part; and wherein said elastically deformable ring part is structured in cross-section so as to exhibit, with increasing flection, a decreasing flexural resistance owing to its deformation, and, in a maximally deformed state, a height to width ratio of the cross-section is at least 4% smaller than in the stress-free state.

2. A tensioning and damping element according to claim 1, wherein the height to width ratio of the cross-sectional profile is reduced by at least 10%.

3. A tensioning and damping element according to claim 1, wherein a core region and an edge region consisting of materials having differing elasticity are provided in the ring part, the material used in the edge region having a greater modulus of elasticity than that of the material used in the core region.

4. A tensioning and damping element according to claim 1, wherein the ring part is in the form of a hollow body.

5. A tensioning and damping element according to claim 4, wherein the hollow body is round in cross-section in the stress-free state, and is flattened in cross-section during deformation of the ring part.

6. A tensioning and damping element according to claim 1, wherein the ring part has, on its radially inward side, at least two arms which are oriented symmetrically with respect to the longitudinal middle plane and which together form an angle, wherein the angle becomes larger with increasing deformation of the ring part.

7. A tensioning and damping element according to claim 6, wherein the angle in the stress-free state of the ring part is from 90° to 130°.

* * * * *